(12) United States Patent
Zapfel

(10) Patent No.: US 11,477,277 B2
(45) Date of Patent: Oct. 18, 2022

(54) COMPUTER-IMPLEMENTED METHOD, COMPUTER PROGRAM AND DATA PROCESSING SYSTEM

(71) Applicant: IOV42 LIMITED, London (GB)

(72) Inventor: Robert Zapfel, London (GB)

(73) Assignee: IOV42 LIMITED, London (GB)

(*) Notice: Subject to any disclaimer, the term of this patent is extended or adjusted under 35 U.S.C. 154(b) by 0 days.

(21) Appl. No.: 17/293,262

(22) PCT Filed: Jan. 15, 2020

(86) PCT No.: PCT/IB2020/050290
§ 371 (c)(1),
(2) Date: May 12, 2021

(87) PCT Pub. No.: WO2020/148663
PCT Pub. Date: Jul. 23, 2020

(65) Prior Publication Data
US 2022/0021732 A1    Jan. 20, 2022

(30) Foreign Application Priority Data

Jan. 15, 2019 (EP) .................................. 19450001

(51) Int. Cl.
*H04L 67/1019* (2022.01)
*H04L 41/0816* (2022.01)
(Continued)

(52) U.S. Cl.
CPC ...... *H04L 67/1019* (2013.01); *H04L 41/0816* (2013.01); *H04L 41/30* (2013.01); *H04L 67/1008* (2013.01); *H04L 67/1034* (2013.01)

(58) Field of Classification Search
CPC . H04L 67/1019; H04L 41/0816; H04L 41/30; H04L 67/1008; H04L 67/1034
(Continued)

(56) References Cited

U.S. PATENT DOCUMENTS

| 8,583,958 B2* | 11/2013 | Surkov | ............... H04L 67/1051 |
| | | | 714/4.1 |
| 10,250,708 B1* | 4/2019 | Carver | ................... H04L 9/0637 |

(Continued)

FOREIGN PATENT DOCUMENTS

WO    2018/217804 A1    11/2018

OTHER PUBLICATIONS

M. S. Zefreh, A. Fanian, S. M. Sajadieh, M. Berenjkoub and P. Khadivi, "A Distributed Certificate Authority and Key Establishment Protocol for Mobile Ad Hoc Networks," 2008 10th International Conference on Advanced Communication Technology, 2008, pp. 1157-1162, doi: 10.1109/ICACT.2008.4493971. (Year: 2008).*

(Continued)

*Primary Examiner* — Melvin H Pollack
(74) *Attorney, Agent, or Firm* — Pillsbury Winthrop Shaw Pittman LLP

(57) ABSTRACT

A computer-implemented method for the random-based leader election in a distributed network of data processing devices, said distributed network including a plurality of identified asynchronous processes, wherein all said identified processes or a subset thereof are running processes participating in the leader election, including the following steps:

Figure 1:
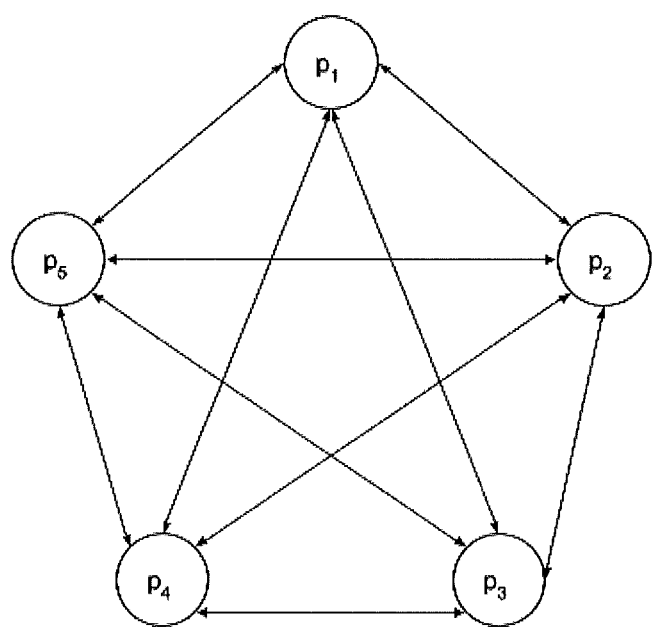

a) a random information is generated by each running process and shared with the other running processes, so that each running process maintains a set of said random information, b) a distributed random information is calculated by each running process from the set of random information by applying a first shared transformation function, so that the same distributed random information is made available to each running process, c) a designator of a single one of said running processes is calculated from the distributed random information by means of a second shared transformation function, (Continued)

d) said designator is used to elect a leader amongst said running processes.

20 Claims, 8 Drawing Sheets

(51) Int. Cl.
  *H04L 41/00* (2022.01)
  *H04L 67/1008* (2022.01)
  *H04L 67/1034* (2022.01)
(58) Field of Classification Search
  USPC .......................................................... 709/221
  See application file for complete search history.

(56) References Cited

U.S. PATENT DOCUMENTS

| | | | |
|---|---|---|---|
| 10,310,762 B1* | 6/2019 | Bhatt | G06F 9/52 |
| 10,397,255 B1* | 8/2019 | Bhalotra | H04L 63/1416 |
| 10,565,227 B1* | 2/2020 | Chen | G06F 16/27 |
| 10,606,863 B2* | 3/2020 | Barber | G06F 16/273 |
| 10,721,335 B2* | 7/2020 | Gupta | H04L 43/10 |
| 10,810,093 B1* | 10/2020 | Tucek | H04L 41/0806 |
| 10,911,433 B1* | 2/2021 | Anand | H04L 67/1004 |
| 2004/0254967 A1 | 12/2004 | Cachin | |
| 2012/0124412 A1 | 5/2012 | Surkov | |
| 2019/0097900 A1* | 3/2019 | Rodriguez | H04L 41/5054 |
| 2019/0104061 A1* | 4/2019 | Zhang | G06F 16/2246 |
| 2019/0121350 A1* | 4/2019 | Cella | G01M 13/04 |
| 2019/0149599 A1* | 5/2019 | Bartfai-Walcott | H04L 67/125 709/226 |
| 2019/0173943 A1* | 6/2019 | Rozenbaum | H04L 41/30 |
| 2020/0019626 A1* | 1/2020 | Todd | G06F 16/29 |
| 2020/0026505 A1* | 1/2020 | Olderdissen | G06F 9/44526 |
| 2020/0026625 A1* | 1/2020 | Konka | G06F 11/2035 |
| 2020/0028901 A1* | 1/2020 | Suresh | H04L 41/0893 |
| 2020/0162264 A1* | 5/2020 | Zamani | H04L 9/3297 |
| 2020/0210261 A1* | 7/2020 | Reddy | G06F 11/3006 |
| 2020/0266989 A1* | 8/2020 | Krcmaricic-Barackov | H04W 12/06 |

OTHER PUBLICATIONS

Ramanathan, M. K., Ferreira, R. A., Jagannathan, S., Grama, A., & Szpankowski, W. (2007). Randomized leader election. Distributed Computing, 19(5-6), 403-418. (Year: 2007).*

Gupta, I., Van Renesse, R., & Birman, K. P. (Oct. 2000). A probabilistically correct leader election protocol for large groups. In International symposium on distributed computing (pp. 89-103). Springer, Berlin, Heidelberg. (Year: 2000).*

Fischer, M., & Jiang, H. (Dec. 2006). Self-stabilizing leader election in networks of finite-state anonymous agents. In International Conference On Principles Of Distributed Systems (pp. 395-409). Springer, Berlin, Heidelberg. (Year: 2006).*

S. Vasudevan, B. DeCleene, N. Immerman, J. Kurose and D. Towsley, "Leader election algorithms for wireless ad hoc networks," Proceedings DARPA Information Survivability Conference and Exposition, 2003, pp. 261-272 vol. 1, doi: 10.1109/DISCEX. 2003.1194890. (Year: 2003).*

Bruce M. Kapron, David Kempe, Valerie King, Jared Saia, and Vishal Sanwalani. 2010. Fast asynchronous Byzantine agreement and leader election with full information. ACM Trans. Algorithms 6, 4, Article 68 (Aug. 2010), 28 pages. DOI:https://doi.org/10.1145/1824777.1824788 (Year: 2010).*

E. Ivashko, I. Chernov and N. Nikitina, "A Survey of Desktop Grid Scheduling," in IEEE Transactions on Parallel and Distributed Systems, vol. 29, No. 12, pp. 2882-2895, Dec. 1, 2018, doi: 10.1109/TPDS.2018.2850004. (Year: 2018).*

Soheil Hassas Yeganeh and Yashar Ganjali. 2016. Beehive: Simple Distributed Programming in Software-Defined Networks. In Proceedings of the Symposium on SDN Research (SOSR '16). Association for Computing Machinery, New York, NY, USA, Article 4, 1-12. DOI:https://doi.org/10.1145/2890955.2890958 (Year: 2016).*

Ren, L., Nayak, K., Abraham, I., & Devadas, S. (2017). Practical synchronous byzantine consensus. arXiv preprint arXiv: 1704. 02397. (Year: 2017).*

International Search Report dated Mar. 11, 2020, issued in corresponding International Application No. PCT/IB2020/050290 (4 pgs.).

Abdelouahid Derhab et al., "A Self-Stabilizing Leader Election Algorithm in Highly Dynamic Ad Hoc Mobile Networks", IEEE Transactions on Parallel and Distributed Systems, Jul. 2008, vol. 19, No. 7, pp. 926-939.

Navneet Malpani et al., "Leader Election Algorithms for Mobile Ad Hoc Networks", Texas A&M University, 2000, pp. 96-104.

Ewa Syta et al., "Scalable Bias-Resistant Distributed Randomness", 2017 IEEE Symposium on Security and Privacy, pp. 444-460.

V. Park et al., "Temporally-Ordered Routing Algorithm (TORA) Version 1 Functional Specification", IETF MANET Working Group Internet—DRAFT, https://tools.ietf.org/id/draft-ietf-manet-tora-spec-04.txt Jul. 20, 2001, 20 pgs.

Mohammad Sheikh Zefreh et al., "A Distributed Certificate Authority and Key Establishment Protocol for Mobile Ad Hoc Networks", Advanced Communication Technology, 10th International Conference, 2008, pp. 1157-1162.

* cited by examiner

1

COMPUTER-IMPLEMENTED METHOD, COMPUTER PROGRAM AND DATA PROCESSING SYSTEM

CROSS-REFERENCE TO RELATED APPLICATIONS

This application is the U.S. national stage entry of PCT/IB2020/050290, filed Jan. 15, 2020, which claims priority to European Patent Application No. 19450001.3, filed Jan. 15, 2019, the entire contents of both of which are herein incorporated by reference in their entireties.

The invention relates to a computer-implemented method for a random-based leader election in a distributed network of data processing devices, said distributed network comprising a plurality of identified asynchronous processes, wherein all said identified processes or a subset thereof are running processes participating in the leader election.

Further, the invention relates to a computer program product comprising instructions which, when the program is executed by data processing devices, such as a computer, arranged in a distributed network cause the data processing devices to carry out the inventive method.

Further, the invention relates to a data processing system comprising a plurality of data processing devices comprising means for carrying out the inventive method.

FIELD OF THE INVENTION

Algorithms for distributed computing make use of synchronisation points to distribute and re-collect the work performed by a group of asynchronously running processes. To accomplish such synchronisation a leader is elected within the group of processes. This leader acts as a single point of contact for clients, distributes the request amongst the processes, and waits to re-collect results and sends a merged response back to the client.

Agreeing on the identity of a leader in a distributed network of data processing devices requires consensus protocols. Consensus protocols make sure that all processes within the group of processes elect the same leader at a given point in time. Consensus protocols are crucial for the functioning of distributed ledger technologies, in order to replicate, share, and synchronize digital data geographically spread across multiple sites, countries, or institutions.

As used herein, a process is the instance of a computer program that is being executed on a data processing device. It contains the program code and its activity. In a distributed network the processes are running on data processing devices that can be distributed across said network, wherein said data processing devices may function as nodes of said network. A process running on a node may also be referred to as a "node". A process is identifiable within the network by a unique identifier, such as a network address.

As used herein, the term "identified process" designates any process that is running on a data processing device located in the network and that is known to the system. The term "running process" refers to a process that is currently participating in the leader election, wherein this can include all identified processes or only a subset thereof.

Generally speaking, leader election algorithms need to meet a minimum set of requirements comprising the following conditions:
Liveliness: every process should eventually enter an elected or non-elected state.

Safety: only one single process can enter the elected state within an election round (also known as uniqueness condition).
Termination: the election should finish within a finite amount of time.
Agreement: all processes know who the leader is.

PRIOR ART

Leader election algorithms can be classified based on their underlying communication strategy (either single-hop or multi-step) for the communication between the distributed processes:
Synchronous: processes need a common clock signal to sync up.
Asynchronous: processes can run at arbitrary speeds.

In case of single hop networks (in which all communication is done directly without any intermediaries) the leader election algorithms divide time into equal time slots and send their messages within those time slots, wherein algorithms can be classified based on the information stored:
Oblivious: these algorithms do not hold any history. Transmission probability may change over time but it is the same for all nodes.
Uniform: channel state history is saved in these algorithms. Transmission probability is a function of channel history and it is same for all nodes. The algorithm does not know the number of nodes.
Non-uniform: in these algorithms, both the channel state history and the transmission history are saved. The transmission probability depends on these two histories and is different for various nodes. The algorithm knows the number of nodes.

For multi-step networks, where all nodes have unique identifiers and all links are two sided and FIFO, there is no need to know a priori the number of participating nodes and there are no restrictions on their maximum number. Such networks can operate on the following leader election algorithms:
Extreme finding algorithms, where leaders are elected based on the value of certain parameters, such as computational power or energy left. Examples of these are: LEAA (Leader election algorithm for Ad), CBLEAA (Candidate base LEAA), SEFA (Secure extreme finding), SPLEA (Secure preference-based leader);
Hierarchical algorithms, where a network is divided into clusters including one cluster leader group called cluster head and some other cluster node. Examples of these are: LPL (Election Portion Leader), SPHA (Special-purpose Hierarchical Algorithm), LELN (Leader Election Algorithm in Low-level Network);
Random election algorithms, where nodes have unique identifiers and are organised in ad-hoc directed acyclic graphs. The randomization is currently used only for the formation of ad-hoc graphs, whereas the main leader election alongside such graphs uses other means, like voting or proof of work. Prior art for these are: TORA [Vincent Park and Scott Corson. Temporally Ordered Routing Algorithm. University of Maryland and Naval Research Laboratory, 2002], NVVV00 [Navneet Malpani, Jennifer L. Welch, Nitin Vaidya. Leader Election Algorithms for Mobile Ad Hoc Networks. Texas A&M University, 2000], DB08 [Abdelouahid Derhab, N. Badache. A Self-Stabilizing Leader Election Algorithm in Highly Dynamic Ad Hoc Mobile Networks. IEEE Transactions on Parallel and Distributed Systems, p. 926-939, August 2008], and ZMR19 [Mandi Zamani, Mahnush Movahedi, Mariana Raykova. Network for Improved Verification Speed With Tamper Resistant Data, WO 2018/217804 A1, 2019].

TORA is a random leader election algorithm, where an election is based on unique node identifiers. In this algorithm, a height is assigned to each node. The algorithm is based on building directional trees "without loops or DAG": in such trees all nodes are guided towards a destination node. It requires nodes to only communicate with their current neighbours. The leader election is done by comparing each nodes' parameters. An edge is drawn from a node with higher height to a node with a lower height. Each node has five parameters, based on which a comparison of height is conducted. The comparison is done starting with the first parameter. If this parameter has the same value for both nodes, the next parameter is taken into account. If the first four parameters are the same, the fifth parameter is compared, as it is the unique node identifier, which is different for every node. The leader is then the node with the largest height. In case of a network partition, the node that detects the partition sends out an indication to other nodes in its component so that they cease performing height changes. TORA uses a global time source and handles partitioning and merging.

[NVVV00] is a leader election algorithm for mobile ad hoc networks. It is based on TORA. Unlike TORA, [NVVV00] uses six parameters instead of five. The additional parameter is the ID of a node believed to be the leader of the i-th node. The way [NVVV00] handles network partitions is also different: here, the first node to detect the partition elects itself as the leader of the new component (partition). In case two components meet, the leader of the component with the smallest ID will eventually become the sole leader of the new merged component. Apart from partitioning cases, the basic leader election remains the same as in TORA: the leader is the node with the largest height.

[DB08] builds on [NVVV00] and attempts to solve the issue where nodes are not always responsive (and concurrent changes occur) by denoting the first three parameters in height as 'reference level' and giving the node with the smaller reference level higher priority. The [DB08] algorithm also maintains additional information in each node (first is the process start time, second is the time the node received the special reference number). A comparison of these additional parameters is also done. This makes the [DB08] algorithm 10 to 100 times faster than the [NVVV00] algorithm.

[ZMR19] suggests a multi-level multi-hop structure where running nodes are organised in committees. They briefly describe a distributed random number generated similar to what has been presented first time in RandHerd [Ewa Syta, Philipp Jovanovic, Eleftherios Kokoris Kogias, Nicolas Gailly, Linus Gasser, Ismail Khoffi, Michael J. Fischer, Bryan Ford. Scalable Bias-Resistant Distributed Randomness. IEEE Symposium on Security and Privacy, May 2017]. [ZMR19] makes reference to a largely simplified process where each node generates a random string, performs a proof of work process using the random string and a hash function, and a node is elected to a leader committee based on the proof of work process. The distributed random information needs to be the same and known across all nodes in order for each node to be able to verify the puzzle's solution, making [ZMR19] an interactive protocol and leaving the leader election method described in [ZMR19] prone to adversaries with strong compute power.

One common observation across current random leader election algorithms is for random information (distributed or not) being used as a facilitator for higher-order leader election methods, such as picking parameters or creating temporary graphs for them, or to create groups or subgroups of nodes within a network, or to seed a proof of work puzzle. Current methods, in many kinds and variations, are interactive and expose the current leader as a systemic weakness and a single point of failure under adversarial attacks by attributing special roles and behaviours to some current leader, election initiator or coordinator, and by allowing advantages for adversaries with strong computational power.

From the above it follows that there is still a need in the art for an improved leader election method in asynchronous distributed systems where all nodes in said asynchronous distributed systems can be kept absolutely equal with regards to their role and function. The instant invention aims at improving a method for a random-based leader election in a distributed network. In particular, the instant invention aims at randomly electing a leader in one single step across a plurality of running processes where every said process is equal in their rights and roles, and where the level of randomness in the leader election process is increased above prior art so as to make any predetermination of a leader computationally hard to predict, and where some embodiments of the invention can be used to increase the level of prevention of manipulations. The risk of an adversary controlling the leader election by manipulating some processes to act in their favour shall be minimized.

SUMMARY OF THE INVENTION

In order to solve these and other obstacles, the invention provides a computer-implemented method for a random-based leader election in a distributed network of data processing devices, said distributed network comprising a plurality of identified asynchronous processes, wherein all said identified processes or a subset thereof are running processes participating in the leader election, said method comprising the following steps:

a) a random information (r) is generated by each running process and shared with the other running processes, such that each running process eventually receives and subsequently maintains a set of said random information (r), b) a distributed random information (R) is calculated by each running process from the set of random information (r) by applying a first shared transformation function ($f_1$), so that the same distributed random information (R) is made available to each running process, c) a designator of a single one of said running processes is calculated from the distributed random information (R) by means of a second shared transformation function ($f_2$), d) said designator is used to elect a leader amongst said running processes.

The invention is based on the idea to derive the leader assignment from a distributed random information (R) that is calculated jointly by all running processes in just one communication round, allowing a leader to be computed autonomously by each process. In particular, each running process contributes its own random information (r) to the calculation of the distributed random information (R) so that a very high level of randomness is achieved.

If, as in accordance with some embodiments of the invention, the sequence of steps a)-d) is repeated at regular or irregular intervals, the elected leader changes randomly. Each sequence of steps a)-d) will be referred to as "election round".

Preferably, a plurality of said election rounds of random-based leader elections overlap and are performed concurrently amongst said running processes.

The invention allows to concurrently perform several election rounds where the rounds can overlap and where for each round the leader election can be derived from a distributed random information (R) that is calculated jointly by all running processes in just one communication round, allowing a leader to be computed autonomously by each process for each round and as such it allows for multiple leaders to co-exist within the same plurality of running processes in relation with a plurality of concurrent and overlapping rounds at any point in time, and at the same time keeping the method non-interactive, so that there is no requirement of coordinators or previous leaders or the addition of any administrative or interactive protocol components.

The random information (r) generated locally by each running process may be any piece of digital information that is randomly generated, and preferably may be in the form of a number. A non-deterministic or uncorrelated pseudo-random number generator may be used to generate said random information (r) in each running process.

According to step a) of the method of the invention the random information (r) that is generated by each running process is shared with the other running processes, so that each running process maintains a set of said random information. In particular, said sharing of the random information (r) among the group of running processes is carried out in a single uni-directional communication round resulting in the method being non-interactive.

The transmission of the random information (r) from the respective running process to the other processes may be direct. However, even in the case of an indirect communication, the random information (r) must remain unchanged and/or unprocessed during its communication path. In particular, the sharing of random information (r) is performed without the need for mediator or coordinator nodes to synchronise the information exchange required to agree on a common random, because such mediators would introduce a particular vulnerability in the leader election process. Preferably, the random information (r) is shared with the other running processes in one asynchronous message broadcast directly over single step peer to peer communication channels.

According to step b) of the invention, the distributed random information (R) is calculated by each running process from the set of random information (r) by applying a first shared transformation function ($f_1$). Each running process uses the same transformation function ($f_1$). This first transformation function ($f_1$) is known to all running processes so all running processes can calculate the distributed random information (R) on their own, and independently from each other. In general, any type of transformation function which ascertains that the distributed random information (R) is a function of the random information (r) of all running processes may be used. The first transformation function may be based on some calculation operation, such as XOR or hashing, or a combination thereof. According to a preferred embodiment of the invention in order to achieve unbiased results the first shared transformation function is $R=\Pi_{i=1}^{n} r_i(\mod o)$, wherein
R is the distributed random information,
$r_i$ is some random information of a running process $p_i$,
mod is the modulo operation, and
o is a Mersenne prime defined as $o=2^n-1$, with n preferably being $\leq 31$.

This means that the calculation of R is based on a multiplication of the integers (r) in a finite field of Mersenne prime order. In this way, a leader may be found amongst a group of processes and the probability for each process to be elected is equal.

The first transformation function may also be devised such that the distributed random information (R) is a function of the random information (r) of the running processes and, additionally, of another piece of information, such as structured data from a client request. This allows for a plurality of concurrent leaders during each single round, where a leader is elected for each client request.

In order to reliably derive a leader from the distributed random information (R) in each running process, a preferred embodiment of the invention provides that each running process maintains a sorted set (K) of all running processes and the total number (k) of running processes. The sorted set of all running processes contains all running processes that participate in the leader election, which requires that all known running processes are identifiable by each process. In particular, each running process is identifiable by a unique identifier, such as a network address. The set being sorted means that the running processes are contained in the set in a defined sequence so that each process has a determined position within the set.

With regard to step c) of the inventive method, a second shared transformation function ($f_2$) is used to calculate a designator of a single one of said running processes from the distributed random information (R). Since the distributed random information (R) is calculated by each running process, the leader can be elected by each running process autonomously, i.e. entirely from local information, requiring no further interaction between the processes in the distributed network or with any other external processes. Accordingly, the running processes do not require any coordinator, leader, start-election process or any other means of coordination so that at no point in time any special role or function is required for one or more processes out of said plurality of running processes to perform the method of the invention. Therefore, the invention effectively prevents a greater likelihood of being exposed to an adversarial risk for any single running asynchronous process above the average probability of exposure amongst said running asynchronous processes, so that effectively the probability of risk exposure of all single running asynchronous processes is equal.

According to a preferred embodiment, the second shared transformation function ($f_2$) is defined as $m=R(\mod k)$, preferably $m=R(\mod k)+1$, wherein m is the designator of the elected leader,
R is the distributed random information,
k is the total number of running processes, and
mod is the modulo operation,
wherein the leader is preferably elected by selecting the running process that corresponds to the $m^{th}$ element in said sorted set (K) of running processes.

The combination of this function relying on the modulo operation of the total number of running process with the transformation in a field of Mersenne prime order ensures an even distribution among the processes. Increasing the modulo operation by the number 1 ensures that the result of the function is in the range of 1 to k. In this case, the result m directly points to the elected process, which is identified as the $m^{th}$ element in the sorted set (K) of running processes, where the index of the first element in said sorted set (K)

starts at 1. Prior art defines some mapping between random numbers to designated leader processes by choosing selected bits from the random results. This constrains the acceptable number of running processes to a power of 2—whereas the combination of the two transformation functions in this invention allows for any number of running processes at any given time.

In leader elections it is crucial to ensure that a majority of all identified processes take part in the election process. In particular, a specific quorum must be fulfilled. To this end, according to a preferred embodiment, each running process maintains information on the total number (n) of all identified processes and verifies, if the total number (k) of running processes corresponds to a predefined quorum of the total number (n) of all identified processes, wherein steps b), c) and/or d) are performed only if the quorum is fulfilled. In the simplest case, the quorum is defined as the simple majority n/2+1 of all identified processes. In order to achieve fault tolerance, such as byzantine fault tolerance, the quorum is set to consider a defined number of faulty processes. When applying a byzantine majority quorum, f shall be the maximum number of tolerated faulty processes and the relationship between n and f shall be constrained to be n=3f+1. A byzantine majority quorum is derived by using the simple majority formula and ignoring f faulty processes, so as to define:

$$q_{byzantine} = \frac{n}{2} + f + 1$$

In a dynamic environment, it is preferable to update the system so as to include joining processes that are joining the group of running processes or to exclude processes, such as failing or leaving processes from the group of running processes.

To this end, according to a preferred embodiment of the invention, the sorted set (K) of running processes is updated to include a process joining the group of running processes, wherein each running process, including the joining process, in step a), is sharing its sorted set (K) of all running processes with the other processes and the sorted set (K) maintained in each running process is merged with the shared sorted set (K).

Further, according to another preferred embodiment of the invention, the sorted set (K) of running processes is updated to remove a process leaving the group of running processes, wherein the leaving process is sending a leave message comprising a process identifier to the other running processes, and the leaving process is removed from the sorted set (K) of running processes.

According to yet another preferred embodiment of the invention, the sorted set (K) of running processes is updated to remove a failing running process, wherein
    each process identifies that it has not received any random information (r) being shared by the failing process,
    each process sends a fail message to all remaining running processes inquiring whether the failing process has been identified in the remaining running processes, and
    removing the failing process from the sorted set (K) of running processes upon receipt of a confirmation messages from all remaining running processes.

Referring now to the possible ways of sharing the random information (r) generated at each running process with the other running processes according to step a) of the inventive method, an embodiment of the invention provides that the sharing of random information (r) in step a) comprises the steps of:
    each running process submitting its random information (r) to a total order broadcast system,
    the total order broadcast system broadcasting the random information (r) received from all running processes to each running process in the same order.

The advantage of using a total order broadcast system is that the messages containing the random information (r) are received by all running processes in the same order. Therefore, each running process has the same set of random information (r) with the individual random information (r) being in the same order, so that the distributed random information (R) can be calculated instantaneously.

However, the messages containing the random information (r) may also be exchanged in any arbitrary order. Said arbitrary order can result in said messages to belong to different random-based leader election rounds for which said messages can be exchanged amongst said running processes at any arbitrary point in time.

In a preferred embodiment of the invention, wherein the running processes can receive the random information (r) from the other processes in any arbitrary order and/or for different concurrent election rounds, the random information (r) can be sorted according to predefined criteria to ensure that the set of random information maintained in the running processes eventually becomes identical in all running processes. In this connection, a preferred embodiment of the invention provides that the sharing of random information (r) in step a) comprises the steps of:
    each running process assigning a generator round identifier (g) to the generated random information (r) so as to obtain a tuple (r,g) each consisting of a random information (r) and a generator round identifier (g),
    each running process sending the tuple, preferably directly, to all other running processes,
    each running process collecting tuples received from the other running processes, so as to obtain said set of random information (r), which takes the form of a collection of tuples consisting of tuples (r,g) having the same generator round identifier (g),
    comparing the number of tuples in said collection of tuples with the total number (k) of running processes;
and step b) is initiated, if the number of tuples in the local collection is equal to the total number (k) of running processes.

If, as in accordance with a preferred embodiment, the running processes generate a new random information (r) at regular or irregular intervals, the sharing of random information (r) in step a) comprises the steps of:
    each running process assigning a generator round identifier (g) to each generated random information (r) so as to obtain tuples (r,g) each consisting of a random information (r) and a generator round identifier (g),
    each running process sending the tuples directly to all other running processes,
    each running process collecting tuples received from the other running processes, so as to obtain sets of random information (r), which take the form of collections of tuples, each collection consisting of tuples (r,g) having the same generator round identifier (g),
    a generator round is being marked as locally complete if the number of tuples in a collection of tuples is equal to the total number (k) of running processes;
and step b) is initiated with regard to the completed generator round.

If, as in accordance with a preferred embodiment, the running processes generate a new random information (r) at regular or irregular intervals, a status change to mark some election rounds as globally complete comprises the steps of:

each running process collecting tuples received from the other running processes, so as to obtain sets of random information (r), which take the form of collections of tuples, each collection consisting of tuples (r,g) having the same generator round identifier (g), a running process marking a collection of tuples as locally complete if the number of tuples in a collection of tuples is equal to the total number (k) of running processes;

each running process determining that a quorum of tuples (r,g) has been reached for a particular collection of tuples referring to a generator round (g), marking all previous locally complete collection of tuples as globally complete.

This procedure defines that all locally complete collection of tuples referring to rounds before the actual round (g) can be assumed to be locally complete on all running processes with very high probability and a leader designated by any globally complete collection of tuples can be used as a leader to coordinate arbitrary distributed computing tasks, e.g. client requests.

In order to restrict the number of concurrent sets of random information (r) maintained in all running processes, a preferred embodiment provides that a maximum number of collections of tuples is defined and a collection of tuples is deleted when a new collection of tuples is to be maintained by a running process and/or the maximum number of collections would otherwise be exceeded.

In order to enhance fraud prevention, the running processes may exchange a cryptographic commitment about their random information (r), before any of the running processes starts exchanging its random information (r) for the process of determining a distributed random information for a round, in order to enforce honesty in providing such random information (r). In accordance with a preferred embodiment of the invention said commitment can be sent along with a previous round's disclosure of random information, such that the number of messages exchanged does not increase.

Running processes may also identify each other by using a cryptographic identity, such as (but not exclusively) asymmetric and symmetric cryptographic keys.

DETAILED DESCRIPTION OF THE INVENTION

In the following, the invention will be described in more detail by reference to specific preferred embodiments of the invention.

1. Generating a Distributed Random Number

The following describes a non-interactive protocol used by n processes in a distributed network to generate a distributed random number R in one round. At periodic intervals each process generates a random number r and sends it to all other processes. Each process collects the random numbers from all other processes and, once the collection is complete for a given round, generates a composite number R under a first transformation function. This sending and collecting is called a leader election round. Since the reception of random numbers r for a particular leader election round can occur at different times and out of order and for different leader election rounds concurrently, every process implements a vector $\vec{V}$ of size σ to support the processing of a concurrent rounds.

FIG. 1 illustrates a set of identified processes $P=\{p_1, p_2, \ldots p_n\}$ in a distributed network, such that the number of processes n=|P|, wherein λ is the maximum network latency in milliseconds amongst all processes $\in P$. Let φ be the frequency of leader election rounds, i.e. how frequently per second a new leader election round is started, such that φ>>λ.

Let $e \in \mathbb{Z}$ be an integer exponent of 2, with e≥31, and identical for all p∈P. Let $\mathbb{Z}_o^+$ be a finite field of prime order o, such that o is the largest prime in $2^e$. For example 65521 is the largest prime in $2^{16}$ and $\mathbb{Z}_o^+$ would contain the integers {0, 1, 2, ... 65520}. Ideally, the use of a Mersenne prime of the form $M_e=2^e-1$ is preferred to eliminate the overshoot of randoms in $\mathbb{Z}_o^+$ beyond o, which otherwise would create a bias towards some first elements in $\mathbb{Z}_o^+$ at a probability or $$\frac{e-o}{2^e}.$$

Preferred Mersenne primes for use with the invention are $2^{31}-1$ and $2^{61}-1$. Let r be a random number generated over n, in the interval [2, o−1]. Because of the transformation function outlined below, elements 0 and 1 must be excluded.

Let $f_R(r_1, r_2, \ldots r_n) \rightarrow R$ be a first transformation function taking random numbers r to produce a distributed random number R. According to a preferred embodiment of the invention, the first transformation function is based on multiplications within the finite field $\mathbb{Z}_o^+$ as $(a \cdot b)_o = (a \cdot b) \pmod{o}$ and defined as:

$$f_R(r_1, r_2, \ldots r_n) = \prod_{i=1}^{n} r_i (\bmod\, o)$$

In the following example, the first transformation function is used to transform 3 random numbers $r_1$, $r_2$ and $r_3$ into a distributed random number R using finite field multiplication. Assuming $r_1$=58042, $r_2$=41007, $r_3$=27559, o=65521 the calculation is done as follows:

1. $r_1 \cdot r_2$ (mod m)=58042·41007 (mod m)=$12448_{65521}$
2. $12448 \cdot r_3$ (mod m)=12448·27559 (mod m)=$51997_{65521}$
3. The calculated distributed random number is R=51997

Figure 2:
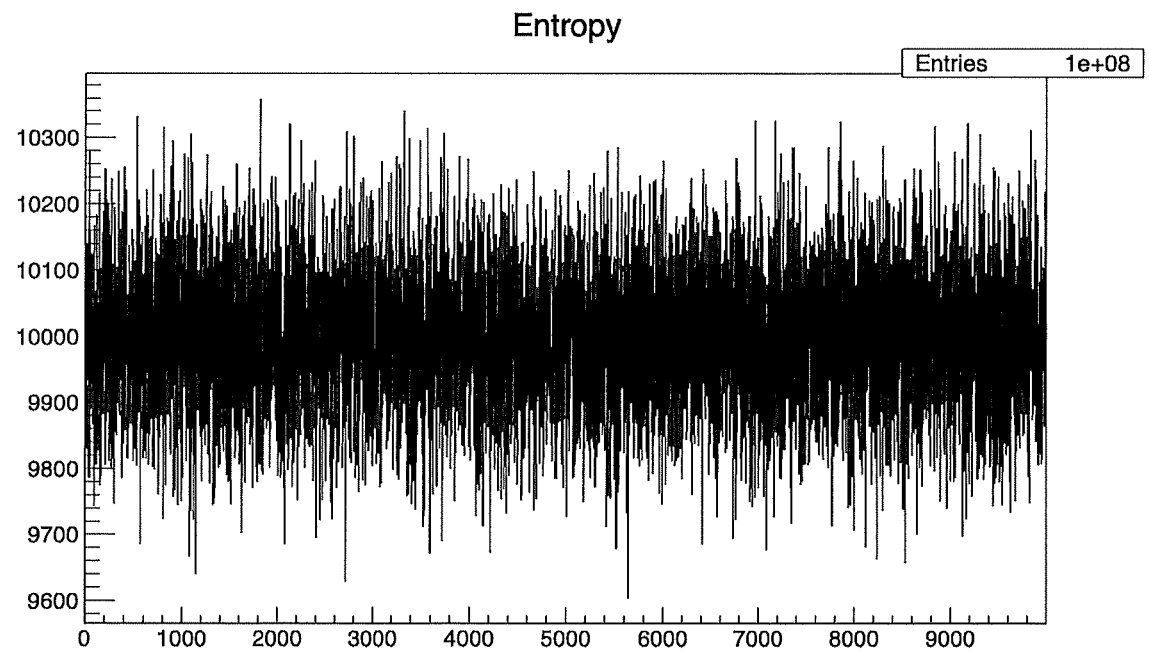

FIG. 2 shows the entropy of the transformation function in 100 million rounds of 5 random numbers r using the above first transformation function $f_R$ over a finite field of Mersenne prime order $\mathbb{Z}_{2^{31}-1}^+$ in a histogram of 10,000 buckets. The 500 million random numbers were generated using the Mersenne Twister 19937 generator.

Each generator round is defined as the exchange between processes of random numbers r attributable to the same leader election round. Leader election rounds are numbered and denoted by g, where $g \in \mathbb{Z}$, and start at 1 for each process on distributed network bootstrap.

Let $g_i$ be the current generator round at process $p_i$. At short periodic intervals (preferably every 1 second) each process $p_i \in P$ starts a new generator round by incrementing its counter $g_i$ by one and generating a random number $r_i$ in $\mathbb{Z}_o^+$. The tuple $(g_i, r_i)$ is then immediately broadcast to all the other processes in $P\backslash\{p_i\}$. To denote the strict consecutive order, in which random numbers must be generated, $r_i'$ is defined to be the random number in $\mathbb{Z}_o^+$ generated by $p_i$ in the previous round $g_i'=g_i-1 \cdot r_i'$ shall strictly precede $r_i$, which is denoted as $r_i' \lessdot r_i$.

Let $C_g$ be a collection of tuples $(g_n, r_n)$ within a process $p \in P$ for its round $g$, where the tuple $(g_n, r_n)$ represents the random $r_n$ created by process $p_n$ in round $g_n$ as received by process $p_i$. $C_g$ may or may not exist for a round g within a process p. It follows that $C_g$ comes into existence for round g on process $p_i$ when either a) $p_i$ generates a random $r_i$ for round g and adds the tuple $(g_i, r_i)$ to its $C_g$, or b) the process $p_i$ receives the tuple $(g_n, r_n)$ from process $p_n$ and adds it to its $C_g | g = g_n$.

Figure 3:
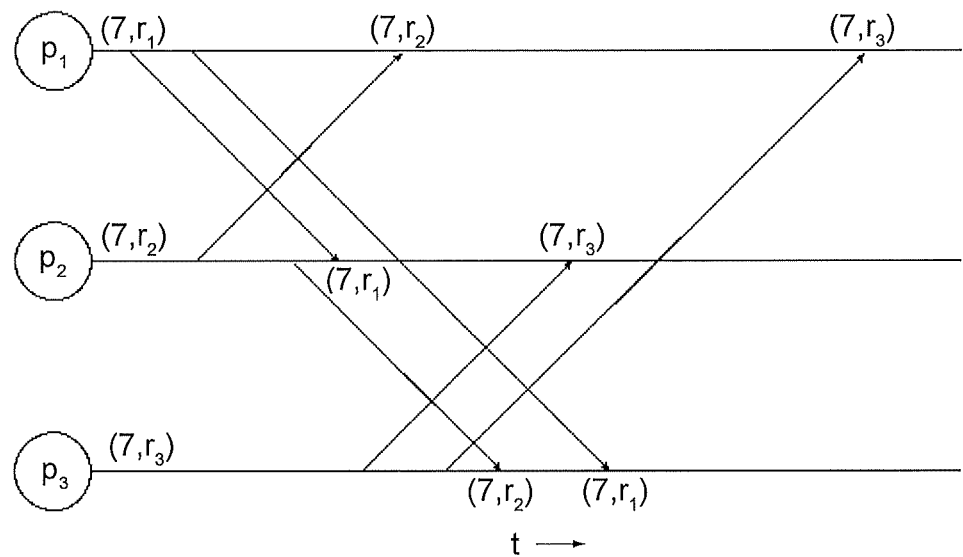

As an example, FIG. 3 shows the generator round 7 comprising 3 processes sending tuples to each other in a distributed network, where every process $p_i$ generates its own random number r and receives tuples $(g_n, r_n)$ from other processes $p_n$.

Let $\vec{V}$ be a vector of collections C created by a process so that $C_n$ is the element at position n in $\vec{V}$. Let $\gamma$ be the maximum size of that vector so that $\gamma \geq |\vec{V}|$. On process $p_i$ the tuple $(g_i, r_i)$ is the random number $r_i$ generated by the local process $p_i$ for round $g_i$ and stored within $C_{gi}$ at position k within $\vec{V}$. The order of random numbers generated is denoted as:

$$r_{i-1} \in C_{i-1} \lessdot r_i \in C_i \forall i \in \{1, 2, \ldots m\}, m = |\vec{V}|.$$

The following example shows a process' collection vector $\vec{V}$ over 7 rounds:

$$\vec{V} \begin{pmatrix} C_1\{1,872\}_1 & \{1,283\}_2 & \{1,924\}_3 \\ C_2\{2,276\}_1 & \{2,982\}_2 & \{2,124\}_3 \\ C_3\{3,842\}_1 & \{3,294\}_2 & \{3,628\}_3 \\ C_4\{4,824\}_1 & \{4,877\}_2 & \{4,482\}_3 \\ C_5\{5,926\}_1 & \{\}_2 & \{\}_3 \\ C_6\{6,436\}_1 & \{6,614\}_2 & \{6,944\}_3 \\ C_7\{\}_1 & \{7,193\}_2 & \{\}_3 \end{pmatrix}$$

(1) Process $p_1$ maintains a local vector $\vec{V}$ comprising collections $C_1, C_2, \ldots C_n$.
(2) $C_5$ for round 5 on $p_1$ comes into existence when $p_1$ creates its random for that round; at this time the collection does not yet contain any other tuples received by $p_1$.
(3) If a process $p_2$ generates a random for round 5 and sends the tuple $(g_5, r_5) = (5, 719)$ to process $p_1$, process $p_1$, will add it to its $C_5$.
(4) $C_7$ comes into existence on $p_1$, when it receives the tuple (7,193) from $p_2$. It is to be noted that at this time $p_1$ has not yet generated its own random for round 7.

As $\gamma$ defines the maximum size of $\vec{V}$, when a process adds a set for a new round to its vector and $|\vec{V}| \geq \gamma$, it first needs to remove the oldest round(s) to achieve $|\vec{V}| = \gamma - 1$ before adding the new round.

As P is a statically defined set of all identified processes in the distributed network, each process also maintains a sorted set (vector) $\vec{K}$ of known (running) processes $\in P$.

Therefore, a generator round g is considered to be locally complete for a process $p_i$, when $|C_g| = |\vec{K}|$, as in the example shown above for the rounds $C_1, C_2, C_3, C_4, C_6$.

$C_g^p$ is defined as a collection C for round g on process p. Further, $C_g^q$ is defined as a collection C for round g on process q. Equality for tuples is defined as $(g_p, r_p) = (g_q, r_q) | g_p = g_q \wedge r_p = r_q$. The collection $C_g^p$ for round g on process p is congruent to collection $C_g^q$ for round g on process q when all tuples match:

$$C_g^p \equiv C_g^q | (g_k^p, r_k^p) = (g_k^q, r_k^q) \forall (g_k^p, r_k^p) \in (g_k^q, r_k^q) \in C_g^p,$$

$$k \in \{1, 2, \ldots i\}, i = |\vec{K}|.$$

Finally, a generator round g is defined to be globally complete, when the $C_g$ on all processes $p_n$ are congruent for a round g, that is:

$$C_g^k \equiv C_g^l | p_k \neq p_l \forall k, l \in \{1, 2, \ldots i\}, i = |\vec{K}|.$$

Any time a collection $C_g$ for a process p becomes locally complete, the process calculates the distributed random number $R_g$ by applying the first transformation function previously defined:

$$f_R(r_1, r_2, \ldots r_n) \rightarrow R_g | r_i \in C_g \forall i \in \{1, 2, \ldots i\}, i = |\vec{K}|.$$

Given the ordering of round numbers, it follows that:

$$R_x \lessdot R_y | x < y \forall x, y \in \{1, 2, \ldots m\} | m = |\vec{V}|.$$

2. Bootstrapping and Quorum

In the following a preferred method will be described how to bootstrap a distributed network of processes so that they find a quorum, and how processes come to consider a leader election round locally complete in order to commence normal operation. As before, a static complete set of identified processes is denoted as P.

Let q be the minimum quorum necessary to run a leader election round, and let $n = |P|$ and $P_q \subset P$ be a quorum subset of P, where $|P_q| = q$, $q < |P|$. Further, $P_0$ is defined as the remainder subset $P_0 = P \backslash P_q$ of processes joining the distributed network at a later time, and constrain $P_0$ with $P_q \cap P_o = \emptyset$.

Figure 4:
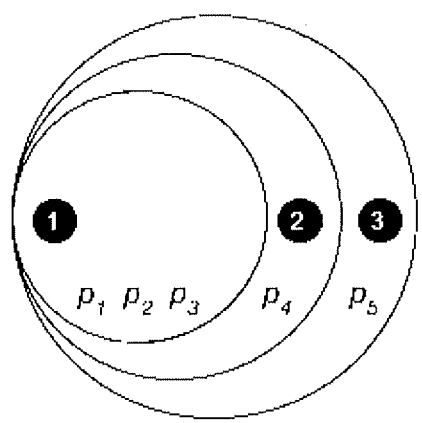

The example shown in FIG. 4 Illustrates a quorum and 2 remainder subsets. FIG. 4 illustrates a total of 5 processes $|P| = n = 5$.

The quorum q is defined as a simple majority of 3 out of 5 processes (inner circle).

The remainder sets define the two processes $p_4$ and $p_5$ joining later.

The outer circle Illustrates a future leaver set comprised of one process $p_5$ that might leave the set of processes later on.

Within the context of the invention, different types of quorum may be applied. A simple majority quorum is defined as $$q_{simple} = \frac{n}{2} + 1.$$

However, in order to achieve byzantine fault tolerance, a byzantine majority quorum may be used instead of a simple majority quorum. In this connection, f shall be the maximum number of tolerated faulty nodes and the relationship between n and f shall be constrained to be $n = 3f+1$. A byzantine majority quorum is derived by using the simple majority formula and ignoring f faulty processes, and define:

$$q_{byzantine} = \frac{n}{2} + f + 1$$

Example calculation for number of nodes and their quorum types, for the tuples: (f, n, $q_{simple}$, $q_{byzantine}$)
- (1, 4, 3, 4)
- (2, 7, 4, 6)
- (3, 10, 6, 9)
- (4, 13, 7, 11)
- (5, 16, 9, 14)
- (6, 19, 10, 16)
- (7, 22, 12, 19)
- (8, 25, 13, 21)
- (9, 28, 15, 24)

For each process the following states can be defined: joining, running, leaving, failing. When a process first starts, its state is "joining". It initializes its current round to g=1 and commences creating and sending out tuples (g,r) to other processes ∈P. Such other processes may exist, and if they exist they eventually receive the tuple sent.

When a process $p_i$ in state "joining" receives a tuple $(g_k, r_k)_m$ from process $p_m$ for round k, and $g_k > g_i$, where $g_i$ is the process' current round, the process adopts the higher round number, adds $(g_k, r_k)_m$ to its collection $C_k$, immediately generates a random for round k and sends its tuple $(g_k, r_k)_i$ to all other processes ∈P. $C_k$ fulfils the quorum at process $p_i$, when $|C_k| \geq q$, and in such case the process switches to state "running".

Figure 5:
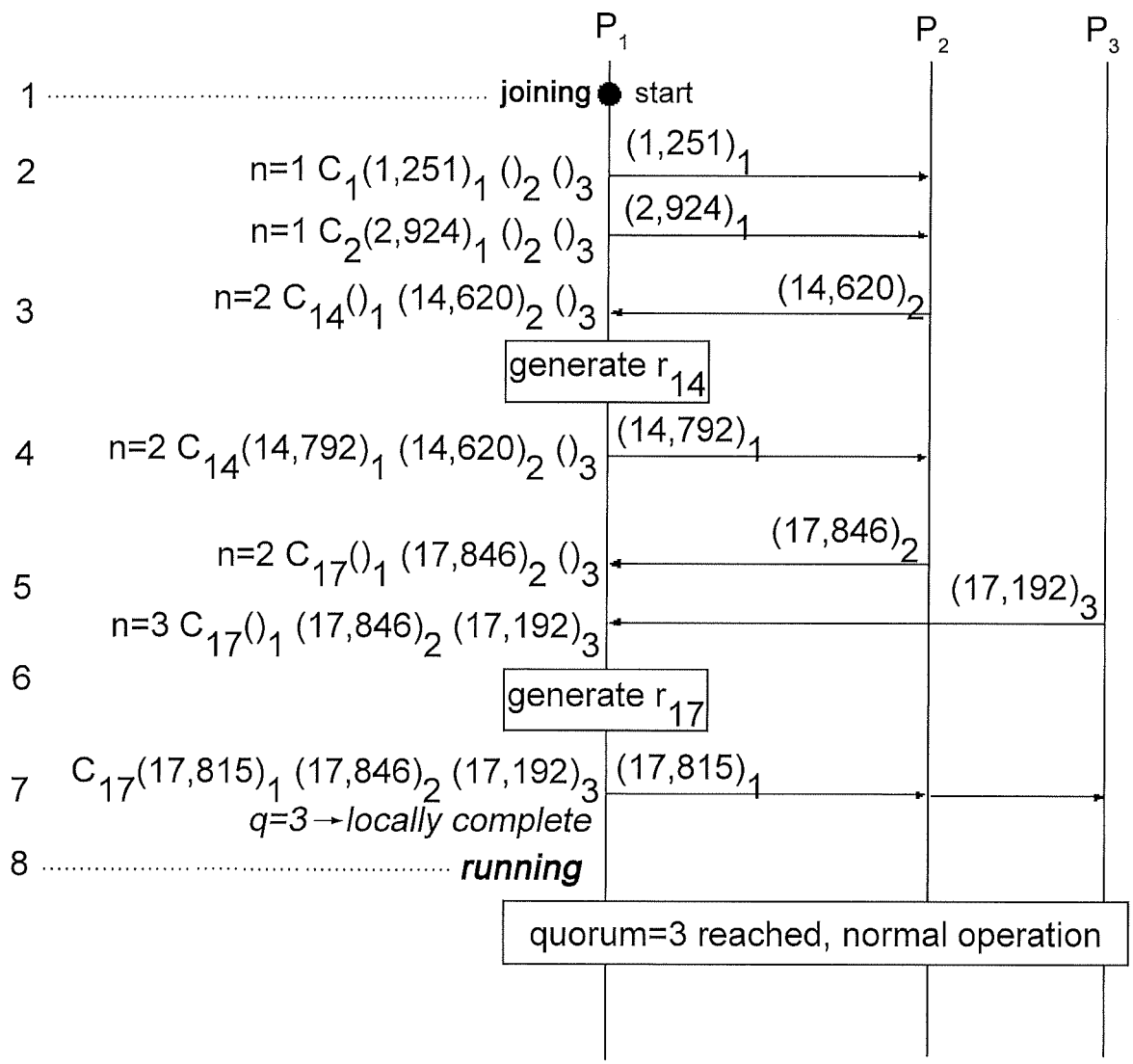

FIG. 5 is an illustration of the process $p_1$ joining the quorum subset ⊂P, where q=3.
(1) Process $p_1$ starts in "joining" state.
(2) $p_1$ commences to send out tuples, starting from round r=1.
(3) $p_1$ receives a tuple from $p_2$ for round 14 and adds it to its local $C_{14}$.
(4) Since this round 14 is further ahead than its local round, $p_1$ adopts this round, generates a random for it and sends the tuple to other processes ∈P (which might not be running at that time). It can also safely abandon all previously created rounds $C_k | k<14$.
(5) Now $p_1$ receives tuples for round 17 from $p_2$ and $p_3$. It can be concluded that $p_2$ and $p_3$ somehow exchanged tuples in parallel and bootstrapped up to round 17 as a set of two without reaching quorum whilst $p_1$ was still busy starting up.
(6) $p_1$ generates a random for it and sends the tuple to other processes E P of which it has $p_2$ and $p_3$ in its vector $\vec{K}$ already.
(7) After $p_1$ adds its tuple for round 17 to its collection for that round, then $C_{17}$ becomes locally complete. $p_1$ can also rightfully assume that $p_2$ and $p_3$ will shortly be able to add its tuple to their $C_{17}$ causing local completeness there as well.
(8) Having determined its first locally complete round, $p_1$ switches to state "running" and continues normal operation. It can also be concluded that $p_2$ and $p_3$ will also switch to state "running" had they not been in that state already. This will result in a state of global completeness for the distributed network, so it can be considered up and ready for client requests.

3. Joining a Process

The method for joining a process $p_{new}$ to the local sorted vectors of known (running) processes $\vec{K}$ in a distributed network is similar to the bootstrap process described above.

As $p_{new}$ joins at some later point in time, $|\vec{K}|$ will have at least the minimum quorum size defined for the network at the other running processes. When the new process joins, it will be added to the vector of known processes $\vec{K}' = \vec{K} \cup \{p_{new}\}$. To enable the addition and subtraction of processes from the respective vectors $\vec{K}$ at each process, when sending tuples each process also sends along its vector $\vec{K}$ of all known processes. Whenever a new process starts and commences sending its tuples, it will also start receiving tuples from other processes and build its $\vec{K}$ by merging its local sorted vector with the one received $\vec{K}'_{local} = \vec{K}_{local} \cup \vec{K}_{received}$. The other processes will add this new process to their $\vec{K}$ and each process in the distributed network will from the following round on base its considerations on $\vec{K}'$.

Figure 6:
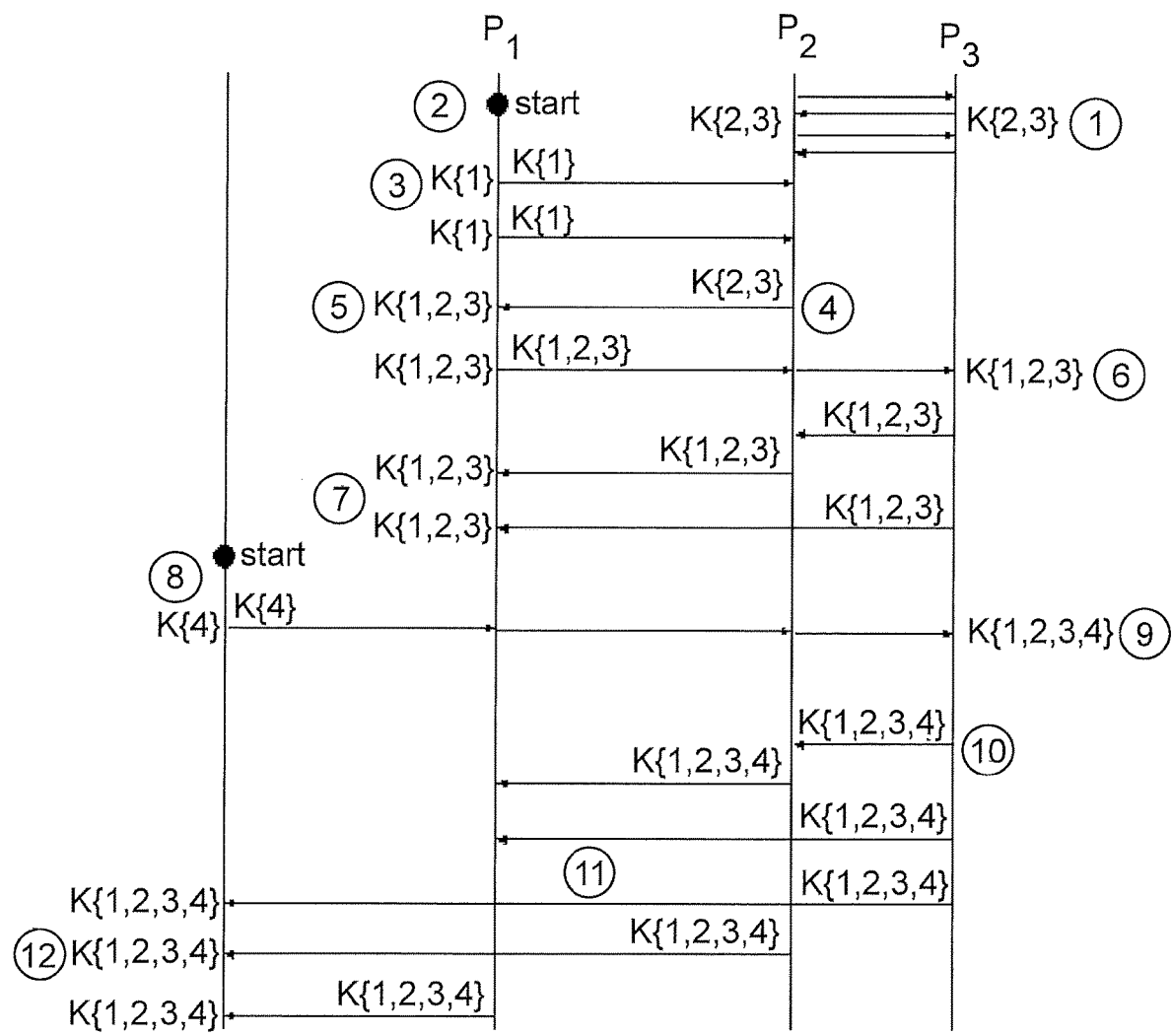

As an example, FIG. 6 is an illustration of processes $p_1$ joining $p_2$ and $p_3$, then $p_4$ joining the three.
(1) Processes $p_2$ and $p_3$ are the initial processes running in a set of two. The quorum is defined as q=2. They exchange their vectors $\vec{K}=\{2,3\}$ with each other. The current set size is $|\vec{K}|=2$.
(2) Process $p_1$ starts and joins the distributed network.
(3) $p_1$ sends its vector $\vec{K}=\{1\}$ along with its tuples to other, yet unknown (running or not), processes in the network.
(4) $p_2$ learns about the existence of $p_1$ and adds it to its $\vec{K}$. It sends the new vector in the next tuple message.
(5) $p_1$ hears back from $p_2$ and merges its local vector with the vector that $p_2$ sent along.
(6) $p_3$ receives a tuple from $p_1$ and merges its local vector with the vector that $p_1$ sent along.
(7) In all messages the processes now have the new vector $\vec{K}'=\{1,2,3\}$ included. The whole distributed network now has $|\vec{K}'|=3$ as criterion for local completeness.
(8) Process $p_4$ starts and sends its vector $\vec{K}=\{4\}$ along in its messages to other, yet unknown, processes in the distributed network.
(9) $p_3$ learns of $p_4$'s existence and merges the vector sent along with its own vector $\vec{K}'=\{1,2,3\} \cup \{4\}$.
(10) It sends along this updated vector in its next tuple message so that processes $p_1$ and $p_2$ will merge their vectors as well.
(11) Processes $p_1$, $p_2$, $p_3$ now recognise $p_4$ as new member in P and use their updated vector from the next tuple message on.
(12) $p_4$ finds the complete vector in the messages received and merges with its local vector. Now all processes know that the distributed network has grown to 4 members and use their updated $\vec{K}$, $|\vec{K}|=4$ from now on to trigger local completeness.

4. Processes Leaving

Processes ∈E P can decide to stop operating at any time. When a process $p_s$ stops, it sends the message leave $(p_s, r_s)$ to all other processes, where $r_s$ is the next round that $p_s$ would normally use to send tuples. $p_s$ also stops sending and receiving tuples.

When a process $p_i$ receives a leave $(p_s, r_s)$ message, it takes $p_s$ out of its local vector $\vec{K}$ of known running processes and checks whether there is still the minimum number of quorum processes alive. Should the number of remaining running processes be less than the minimum required quorum the process switches back to bootstrap state, but in this case will not reset its round number to 1.

Figure 7:
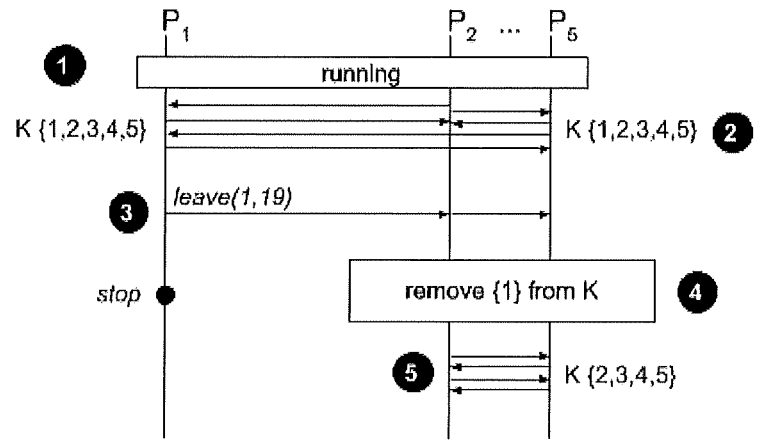

FIG. 7 shows an example of process $p_1$ leaving the set of $p_1$, $p_2$, $p_3$ (1) Processes $p_1$, $p_2$, $p_3$, $p_4$, $p_5$ operate in normal mode "running" at a quorum q=3.
(2) The processes are exchanging tuples for 18 rounds, sending along their sorted vector of known running processes $\vec{K}=\{p_1, p_2, p_3, p_4, p_5\}$.
(3) $p_1$ decides to stop running. It is currently in round 18, so it sends the message leave (1,19) to all other processes in P. This is the last message $p_1$ sends to the network.
(4) Currently running processes $p_2,p_3,p_4,p_5$ remove the leaver from their vector $\vec{K}'=\vec{K}\setminus\{p_1\}$.
(5) $p_2,p_3,p_4,p_5$ check whether they still form a quorum. As q=3 they do and so they continue normal operation, now using $\vec{K}=\{p_2,p_3,p_4,p_5\}$ along with their tuples.

5. Processes Failing

Processes can be failing without a chance to send a leave message. In this section a preferred method is presented to detect failing processes and remove them from the set of currently running processes, which effects the determination of local completeness for leader election rounds.

Let $p_i \in P$ be a running process gathering tuples received for round k into its local collection $C_k$. Let $\vec{V}$ be its vector of collections C and let y define the maximum size of $\vec{V}$. A process $p_a$ is considered to be alive for the collection $C_k$, if $(g_k, r_k)_a \in C_1$, and a process is considered to have failed for $C_k$ otherwise.

Let $\vec{A} \subseteq \vec{V}$ be the set of collections in $\vec{V}$ containing tuples from a process $p_f$. The process $p_f$ is defined to be failing when $|\vec{A}| \ll y \wedge |\vec{V}| = y$. One can derive that failure detection can become available once the processes have initially gone through $y$ rounds in running state.

When a process $p_i$ detects a failing process $p_f$ at the start of a new round, it sends the message fail($g_i,p_f$) to all other processes.

When a process $p_j$ receives fail($g_j,p_f$), it checks the condition $|\vec{A}| \ll y \wedge |\vec{V}| = y$ for his local $\vec{V}$. If the condition is true, it sends confirm($g_j,p_f$) to all other processes. If the condition is false, it sends alive($g_j,p_f$) to all other processes.

When the process $p_i$ receives an alive($g_j,p_f$) message from any other process, it continues normal operation and stops issuing fail messages. One can conclude that $p_i$ must have missed some messages from $p_f$ in the past, and its local $\vec{K}$ or $\vec{V}$ might not be congruent with the other processes. In particular this can occur when the network partitions, dealt with further below.

A process $p_i$ collects confirm($g_k,p_f$) messages for a previously sent fail($p_i,p_f$) until it has collected confirmations from all known processes $\in \vec{K}\setminus\{p_f\}$. It then removes $p_f$ from its $\vec{K}$. $p_i$ keeps sending fail($g_j,p_f$) in each round until it either receives a alive message or it can eventually remove $p_f$ from its $\vec{K}$. After removal of $p_f$ the remaining running processes need to verify if they still form a quorum, or would otherwise revert back to bootstrap state.

Figure 8:
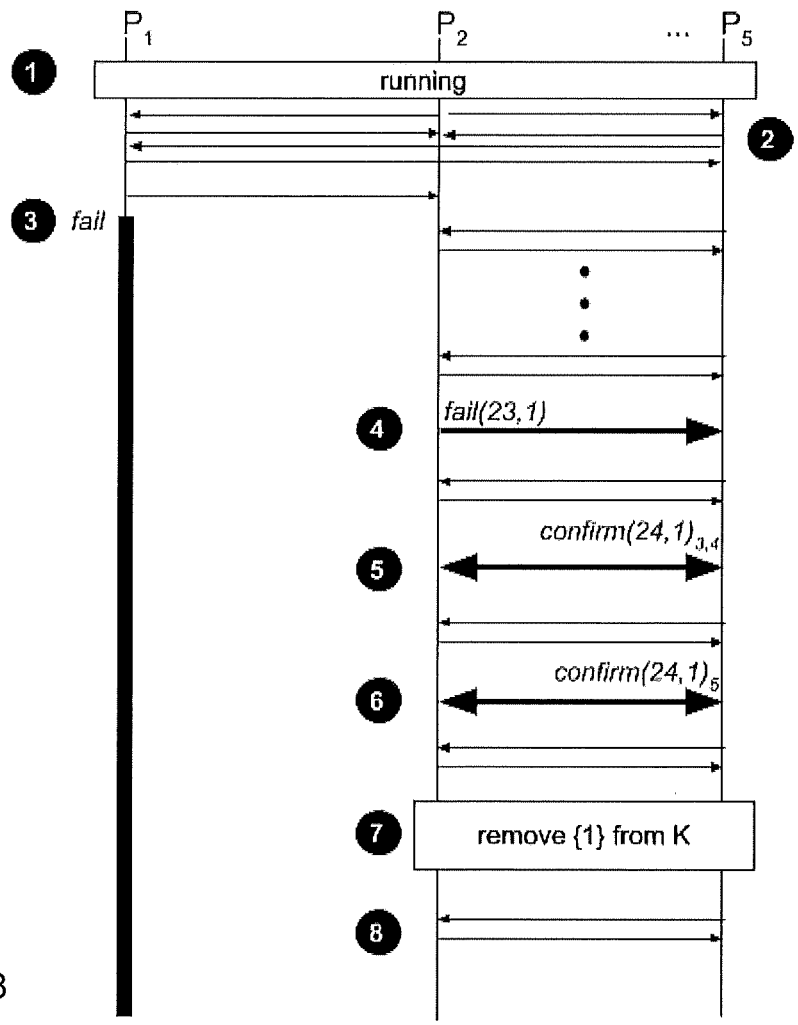

FIG. 8 illustrates an example of process $p_1$ failing, the others detecting it and removing it.

(1) Processes $p_1$, $p_2$, $p_3$, $p_4$, $p_5$ form a set of running processes in a quorum q=3.
(2) The processes exchange tuple messages during normal operation.
(3) Process $p_1$ fails. The other processes stop receiving tuple messages from it.
(4) $p_2$ finds that $|\vec{A}| \ll y \wedge |\vec{V}| = y$ is true for $p_1$ and sends fail(23,1) to the other processes (23 is its current round, 1 the process).
(5) $p_2$ hears back confirm(24,1) from $p_3$ and $p_4$. It registers the message and can ignore the difference in the round number.
(6) $p_2$ hears back confirm(24,1) from $p_5$ and eventually it has now gathered all feedback.
(7) $p_2$ now removes $p_1$ from its sorted vector of running processes $\vec{K}$. Given the symmetry of the message passing, it is concluded that the other processes have run through the same workflow.
(8) Since $p_2,p_3,p_4,p_5$ still form a quorum, they can continue in running state.

6. Network Partitioning

A network partition is defined to be a network split due to some failure of network connections between processes. The following section describes a preferred partition-tolerant behaviour of subnets for the leader election method.

Figure 9:
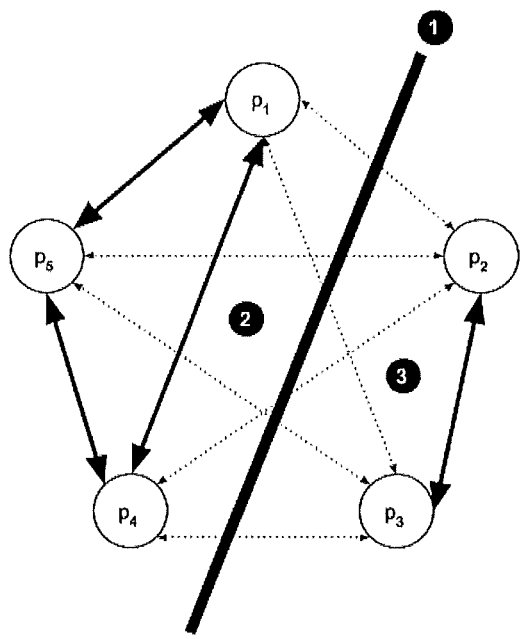

FIG. 9 illustrates an example of a distributed network configured for 5 processes and a quorum q=3.

(1) Some components fail so that the communication is partially broken and the network splits into two segments to the left and right sides of the black bar. The dotted lines depict the interrupted communication channels.
(2) Processes $p_1$, $P_4$, $p_s$ are in the first subnet. They remain in state "running" as they form a quorum of 3.
(3) Processes $p_2$, $p_3$ form the second subnet. Since they cannot form a quorum they change their state to "bootstrap".

Let P be the set of all processes and q a single quorum, as used before. Let $P_1$ be the set of processes in subnet 1, and $P_2$ the set of processes in subnet 2. A network partition is defined as forming exclusive subsets $P_k \subset P$, so that $P_i \cap P_j = \emptyset | i \neq j \forall i,j \in \{1, 2, \ldots k\}$.

Let $n_1 = |P_1|$ and $n_2 = |P_2|$ of a partitioned distributed network of 2 segments. The single majority to form a quorum is $$q = \frac{n_1 + n_2}{2} + 1,$$

where $n_1+n_2=|P|$. Since the quorum q needs to be greater than half of the total number of processes so that $$q > \frac{n_1 + n_2}{2},$$

one can follow that either $n_1 \geq q$ or $n_2 \geq q$ or neither of the two are. One can generalize: let $S=\{P_1, P_2, P_k\}$ be exclusive subsets of P and $n_i=|P_i| \forall P_i \in S$. Then $$q = \frac{n_1 + n_2 + \ldots n_k}{2} + 1$$

and either exactly one segment forms a quorum $n_i \geq q$, $n_j < q | i \neq j \forall j \in \{1,2,i-1, i+2, \ldots |S|\}$ or no segments do $n_j < q \forall j \in \{1, 2, \ldots |S|\}$.

It can be concluded that whenever a network partitions into 2 or more parts, a maximum of 1 part can remain in the status "running".

Figure 10:
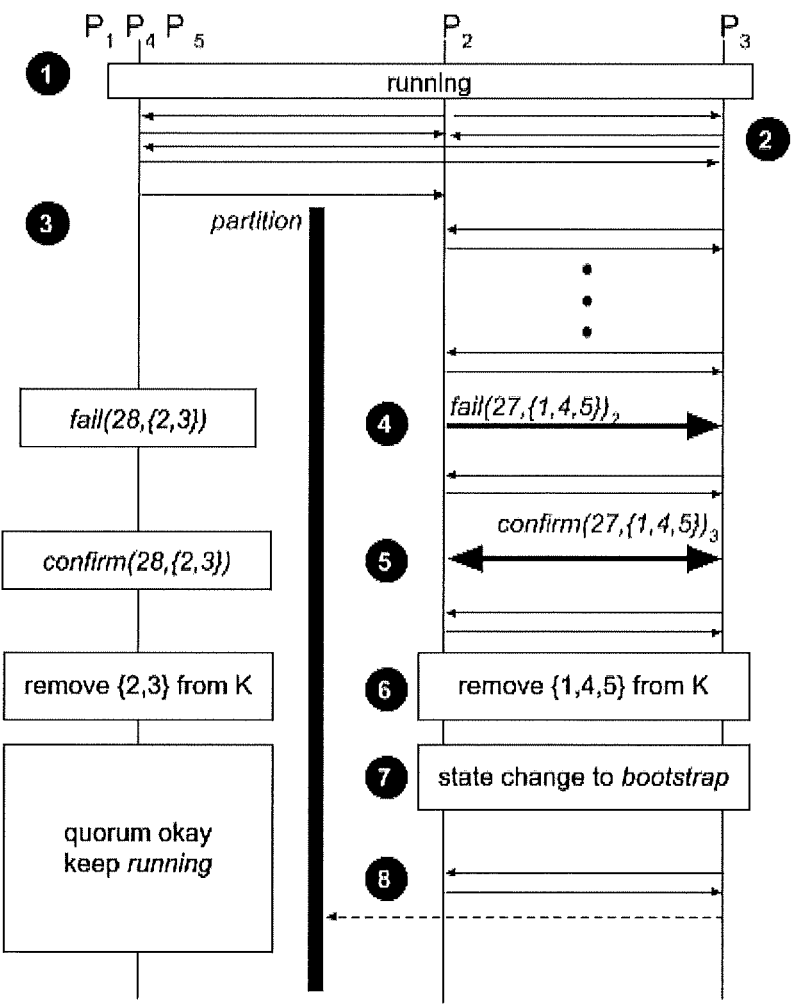

FIG. 10 illustrates an example of the partitioning of a network during normal operation.
(1) A distributed network of 5 processes is running with q=3.
(2) All processes are exchanging tuples.
(3) A network partitioning occurs, splitting the set of processes into a left $p_1$, $p_4$, $p_5$ and right $p_2$, $p_3$ segment.
(4) The processes in the left segment see $p_2$ and $p_3$ failing after some rounds and perform the procedure for failing processes described above. $p_2$ and $p_3$ see the processes $p_1$, $p_4$, $p_s$ failing and execute the same workflow.
(5) In the left and right segments the processes confirm to each other their view on the failed processes.
(6) When confirmed, processes in both segments remove the failed processes from their $\vec{K}$.
(7) During failed process removal, processes in the left segment still form a quorum of 3 and keep their status "running", while the processes in the left segment miss the quorum and switch to state "bootstrap".
(8) Processes in the right segment keep sending each other bootstrap messages. They send those messages to all processes E P. At some later point in time, when the partition ends and the segments will be reunited, the processes in the former left segment will receive bootstrap processes from the right segment, and all processes will add each other again into their $\vec{K}$.

7. Determining a Leader Acting as a Transaction Master

At any given time a distributed network will have $\vec{K}$ known running processes. A request is a message from an external process in the same network (such as a client, see below) to processes $\in \vec{K}$. For each request a master process is determined, using leader election rounds for a leader election as described above.

Let request(m, r, data) be a request message sent by an external process, where $m \in \{1, 2, \ldots |\vec{K}|\}$ is denoted as "master" and specifies an index in $\vec{K}$, r is the leader election round, and data denotes some structured dataset supplied by the client, to be processed by the leader.

The leader is selected by calculating a designator of a single one of the running processes from the distributed random information by means of a second shared transformation function, which, according to a preferred embodiment is defined as $m=(R_r \pmod{|\vec{K}|})+1$.

A process $p_i$ receiving a request message determines whether it is the master for such request by checking whether it is the $m^{th}$ element in its $\vec{K}$. It verifies $p_i=\vec{K}[m]$ and $m=(R_r \pmod{|\vec{K}|})+1$. If the first equation matches, $p_i$ is the addressee for the request; if the second equation matches, $p_1$ is rightfully the leader for round r. If $p_i \neq \vec{K}[m]$, then $p_i$ can safely ignore the request. For $m=(R_r \pmod{|\vec{K}|})+1$ two error conditions are possible:
  1) If the left and right sides of the equation do not match, then the request was addressed to $p_i$ under wrong assumptions by the external process (error, adversary attack). In this case $p_i$ sends back the rejection message error(notmaster) to the external process.
  2) if $R_r$ or $K_r$ does not exist on $p_i$, then the external process might be using a round that is too advanced, too old, or referring to a round that is incomplete. In that case $p_i$ sends back the rejection message error(noround) to the external process.

Figure 11:
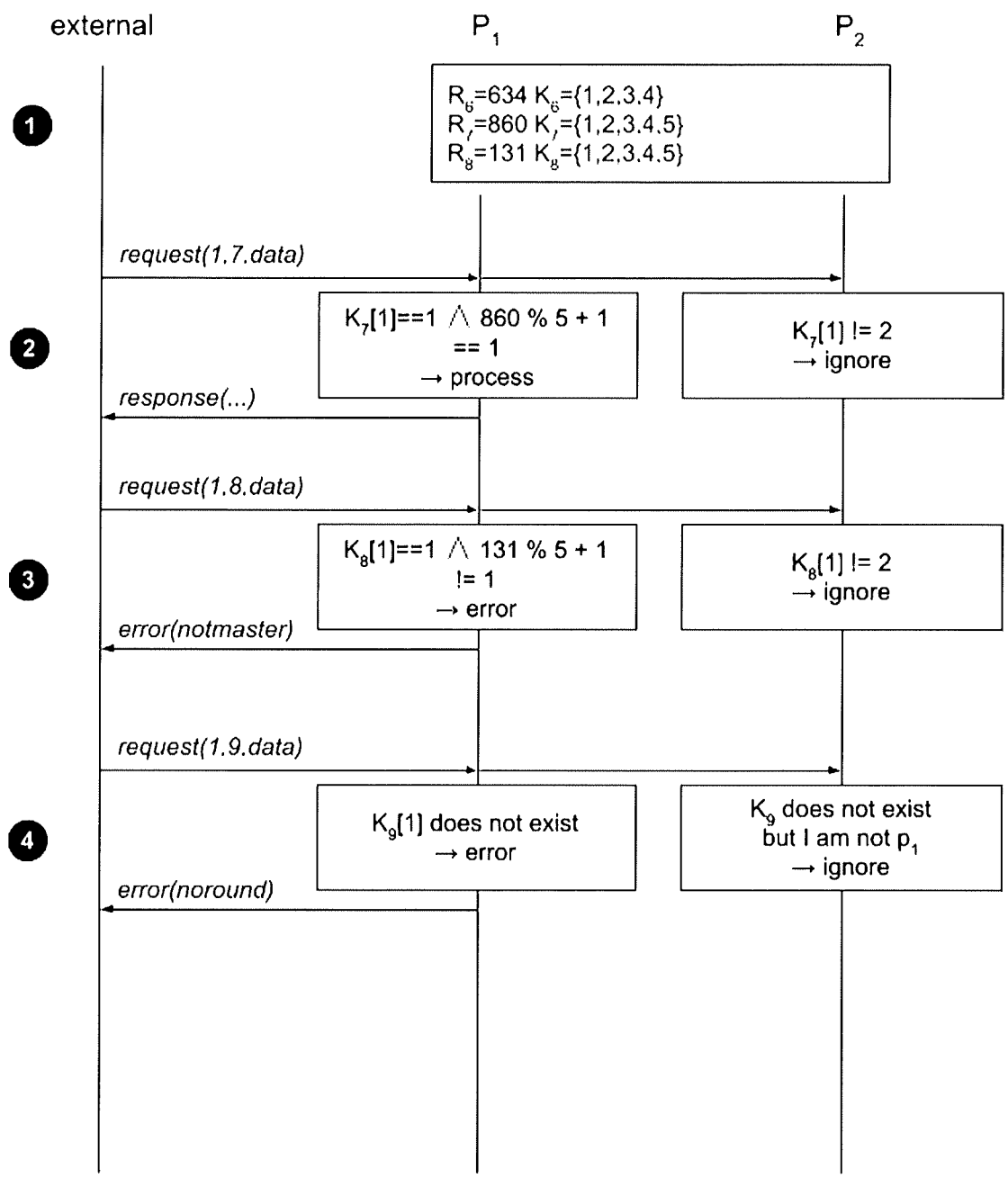

FIG. 11 illustrates an external process sending requests to a distributed network.

(1) Processes $p_1 \ldots p_5$ form a distributed network with quorum q=3. They know about rounds 6,7,8 and maintain the respective distributed randoms $R_k$ and $\vec{K}_k$.
(2) External process sends a request to the network, addressing $p_1$ in round 7 who verifies that its position in $\vec{K}_7$ is indeed at index 1. Additionally $p_1$ verifies $R_7 \pmod{|\vec{K}_7|}+1=860 \pmod 5+1=1$. This is the case, so $p_1$ can process the request.
(3) External process sends a request to the network, addressing $p_1$ in round 8 who verifies its position in $\vec{K}_8$ is indeed at index 1. Additionally, $p_1$ checks $R_8 \pmod{|\vec{K}_8|}+1=131 \pmod 5+1=2 \neq 1$. So $p_1$ sends back an error.
(4) External process sends a request to the network, addressing $p_1$ in round 9 who cannot check its position since $\vec{K}_9$ does not yet exist on $p_1$. So $p_1$ sends back an error. $p_2$ cannot check its position either, but since its last known position at $\vec{K}_{max}=\vec{K}_8$ was 2 it will reject the request.

8. Clients

A client-process (client) is an external process that sends requests to running processes, i.e. processes participating in the leader election. A master is the leader within the distributed network, responsible for a client-process' request, and is expected to send a response back to the client.

In this example, clients join the distributed network and take a read-only role in leader election rounds, i.e. they have their own vectors $\vec{V}$ and $\vec{K}$ together with collections $C_k \in \vec{V}$ to maintain knowledge about current processes, rounds, distributed random numbers, joiners and leavers. A client will thus be able to determine the master for every round.

When a client prepares a request to be sent, it starts with the latest locally complete round g in $\vec{V}$ and calculates the master m from the distributed random number $R_g$ as $m=R_g \pmod{|\vec{K}_g|}+1$. It then uses request(m, g, data) to send its message to either all processes on the distributed network, or directly to the master process $p_n=\vec{K}_g[m]$.

When using broadcasting mode, non-master nodes—while ignoring the master request at leader election level—might kick-off higher level functionality within a process for optimisation, e.g. non-master processes can send their vote on a consensus to the master immediately, saving the master sending out the request first.

When a honest client receives an error or no response within a given time out, it creates a new request using a previous locally complete round's data: request($m_i$, i, data), where $i=\max(j)|j<g \wedge locallyComplete(C_j)=1 \wedge C_j \in \vec{V}$ until it succeeds or the oldest round within $\vec{V}$ has been tried. If all tries remain erroneous, the client has to give up.

Interpretation of Error Conditions for the Client:

error (notmaster) the local $\vec{V}$ and $\vec{K}$ seem to be not in-sync with the distributed network, try the previous round.

error(noround) the local $\vec{V}$ occurs to be more advanced than $\vec{V}$ on master $p_m$, so trying the previous round might be more successful.

timeout when the client has not heard back from master $p_m$, it can assume that $p_{in}$ is probably failing and tries the previous round.

Figure 12:
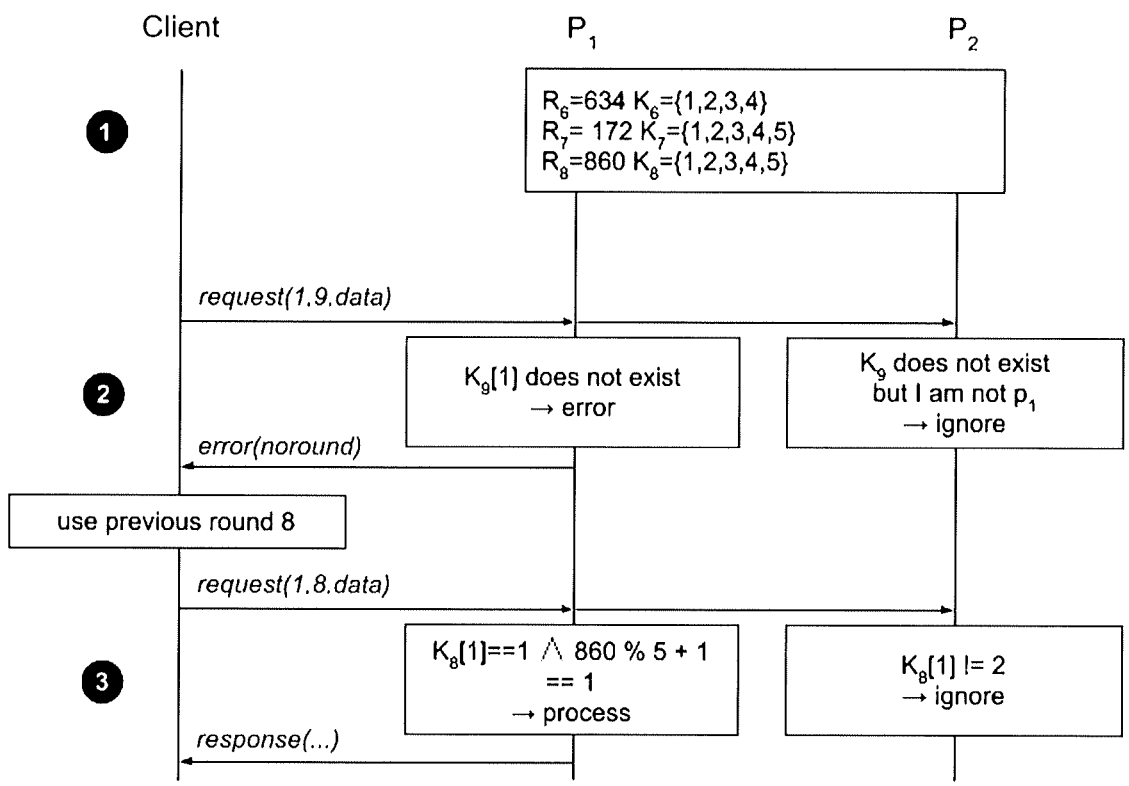

FIG. 12 illustrates a client process sending a request using a too advanced round.

(1) Processes $p_1 \ldots p_5$ form a distributed network with quorum q=3. They know about rounds 6,7,8 and maintain the respective distributed randoms $R_k$ and $\vec{K}_k$.
(2) Client sends a request for round 9, but since round 9 is not yet known or locally complete on $p_1$ the client receives back a error(noround).
(3) The client can decrement its round since $C_8 \in \vec{V}$ and tries again for that round.

9. Master Sharding

According to a further example of an embodiment of the invention, requests to a distributed network can be sharded so that several masters are allowed within the same leader election round. To achieve this, client messages must use structured datasets and an element of that dataset must be $\in \mathbb{Z}_o^+$. To constrain the client from picking arbitrary content to manipulate the master in its favour, that element must either follow some order or have an intrinsic meaning for the higher-level routines associated with the request, such as a serial number, a UUID version 1 with monotonic time increment, or an account number that a particular request binds to.

Using the element $\varepsilon \in \mathbb{Z}_o^+$ from a client's dataset, $\varepsilon$ is multiplied with the actual round's distributed random number $R_9$ over the finite field $\mathbb{Z}_o^+$ to obtain the master for a particular client request:

$$m = ((R_g \cdot \varepsilon)(\mathrm{mod}\ o))(\mathrm{mod}\,|\vec{K}|) + 1$$

10. Preferred Embodiment of the Invention when Used in Total Order Broadcast Systems The complexity of processing messages of arbitrary order in distributed systems is greatly reduced by relying on group communication primitives that provide higher guarantees than standard multicast communication. One such primitive is called total order broadcast. Informally, the primitive ensures that messages sent to a set of processes are received in the same order by every member of the set. Furthermore, when designing a variant of the inventive leader election method, such total order broadcast systems can be used to deliver each message reliably and exactly once to each and every process. As such, in this type of total order broadcast system, random numbers generated by the running processes are received by all processes in the same order, with random number transporting messages being interspersed among the totally ordered stream of arbitrary messages.

As described earlier, each process generates a new random number at regular or irregular intervals, but this time it submits it to the total order broadcast system. To ensure a process uses its own random number at the right place within the total order, that process needs to put its own random number in its local collection set only at the time it receives it back from the total order broadcast system.

For this variant of the invention each process maintains exactly one collection set of random numbers with elements from all running processes. When a process bootstraps, it waits until its collection set is locally complete, then it switches to normal operation mode.

Whenever a process $p_i$ receives a random $r_j$ from process $p_j$, it replaces the current element in its collection set at position j with $r_j$.

As an option, before processing any next message received, $p_i$ calculates a new distributed random number by applying the first transformation function $f_R(r_1, r_2, \ldots r_n) \mapsto R$. Since all processes perform the same calculation in the same order, R is considered to be globally complete over the set of processes P. As a result each process $\in P$ knows the current leader at any position in the message stream. It can be followed that in this variant there is no requirement for separate leader election rounds.

As another option, for each client request received a leader is determined by using an extended first transformation function $f_R(r_1, r_2, \ldots r_n, C) \mapsto R$ to generate a per-request random, where C denotes some data taken from the client request, e.g. its signature. Besides the multiplication of integers in a field of prime order as explained earlier, other transformation functions such as (but not limited to) concatenation, xor, and hashing, and a combination thereof, can be used to generate R. Let l be the maximum number of bits required to represent all processes (e.g. 8-bits=256 processes) and L be the length of R in bits. $\beta$ is denoted to be the maximum bias probability towards the first i processes in P as $\beta = 1/2^{(L-l)}$, where $i = 2^l\ (\mathrm{mod}\,|P|)$. To follow the recommendation on page 46 of the Federal Information Processing Standard 186-4 of the National Institute of Standards and Technology (NIST) for handling bias probability in calculus with low modulo, having $i > 0$, it is recommended to use a transformation function resulting in R having $L \geq l + 64$.

As the leader election in such total order broadcast systems ensures R is totally complete whenever any other message is received, it follows that requiring a client to be involved in leader election messages, and to pick a round and a master, does not apply any more. Client processes send their message to the total order broadcast system, instead to one particular running process (or many). The master for the request is relayed to the clients upon reception of the messages by the appropriate leader.

The invention claimed is:

1. A computer-implemented method for a random-based leader election in a distributed network of data processing devices, said distributed network comprising a plurality of identified asynchronous processes, wherein all said identified processes or a subset thereof are running processes participating in the leader election, said method comprising the following steps:
   a) a random information is generated by each running process and shared with the other running processes, so that each running process maintains a set of said random information,
   b) a distributed random information is calculated by each running process from the set of random information by applying a first shared transformation function, so that the same distributed random information is made available to each running process,
   c) a designator of a single one of said running processes is calculated from the distributed random information by means of a second shared transformation function,
   d) said designator is used to elect a leader amongst said running processes.

2. The method according to claim 1, wherein the sequence of steps a)-d) of claim 1 is repeated at regular or irregular intervals in order to randomly change the elected leader.

3. The method according to claim 1, wherein each running process maintains a sorted set of all running processes and a total number of running processes.

4. The method according to claim 3, wherein the second shared transformation function is defined as $$m = R\ (\mathrm{mod}\ k), \text{wherein}$$

m is the designator of the elected leader,
R is the distributed random information,
k is the total number of running processes, and
mod is the modulo operation, wherein the elected leader is elected by selecting the running process that corresponds to the $m^{th}$ element in said sorted set of running processes.

5. The method according to claim 3, wherein each running process maintains information on the total number of all identified processes and verifies if the total number of running processes corresponds to a predefined quorum of the total number of all identified processes, wherein at least one of steps b), c) or d) is performed only if the quorum is fulfilled.

6. The method according to claim 1, wherein the first shared transformation function is $$R = \Pi_{i=1}^{n} r_i (\text{mod } o), \text{ wherein}$$

R is the distributed random information,
r is the random information,
mod is the modulo operation, and
is a Mersenne prime defined as $o=2^n-1$.

7. The method according to claim 3, wherein the sorted set of running processes is updated to include a process joining the group of running processes, wherein each running process, including the joining process, in step a) of claim 1, is sharing the sorted set of all running processes with the other processes and the sorted set maintained in each running process is merged with the shared sorted set.

8. The method according to claim 3, wherein the sorted set of running processes is updated to remove a process leaving the group of running processes, wherein the leaving process is sending a leave message comprising a process identifier to the other running processes, and the leaving process is removed from the sorted set of running processes.

9. The method according to claim 3, wherein the sorted set of running processes is updated to remove a failing running process, wherein
each process identifies that it has not received any random information being shared by the failing process,
each process sends a fail message to all remaining running processes inquiring whether the failing process has been identified in the remaining running processes, and
removing the failing process from the sorted set of running processes upon receipt of a confirmation messages from all remaining running processes.

10. The method according to claim 1, wherein the sharing of random information in step a) of claim 1 comprises the steps of:
each running process submitting its random information to a total order broadcast system,
the total order broadcast system broadcasting the random information received from all running processes to each running process in the same order.

11. The method according to claim 3, wherein the sharing of random information in step a) of claim 1 comprises the steps of:
each running process assigning a generator round identifier to the generated random information so as to obtain a tuple each consisting of a random information and a generator round identifier,
each running process sending the tuple to all other running processes,
each running process collecting tuples received from the other running processes, so as to obtain said set of random information, which takes the form of a collection of tuples consisting of tuples having the same generator round identifier,
comparing the number of tuples in said collection of tuples with the total number of running processes;

and step b) of claim 1 is initiated if the number of tuples in the local collection is equal to the total number of running processes.

12. The method according to claim 3, wherein the sharing of random information in step a) of claim 1 comprises the steps of:
each running process assigning a generator round identifier to each generated random information so as to obtain tuples each consisting of a random information and a generator round identifier,
each running process sending the tuples directly to all other running processes,
each running process collecting tuples received from the other running processes, so as to obtain sets of random information, which take the form of collections of tuples, each collection consisting of tuples having the same generator round identifier,
a generator round is being marked as locally complete if the number of tuples in a collection of tuples is equal to the total number of running processes;
and step b) of claim 1 is initiated with regard to the completed generator round.

13. The method according to claim 12, wherein a maximum number of collections of tuples is defined and a collection of tuples is deleted if the maximum number of collections is exceeded.

14. The method according to claim 1, wherein a plurality of concurrent overlapping random-based leader election rounds, each round being defined by the sequence of steps a) to d) of claim 1, is performed, wherein
a plurality of random-based leader election rounds are maintained by each said running process and a random information is generated over a field of Mersenne prime order by each running process for each particular round exchanged with the other running processes, so that each running process maintains a collection of said random information per concurrent random-based leader election round,
each process upon receiving a random information determines a local completeness of random information received from other running processes for a particular random-based leader election round, and a distributed random information is calculated over the multiplicative field of Mersenne prime order by said running process from the locally complete collection of random information of a particular random-based leader election round, so that the same distributed random information is made available to each running process,
each process upon receiving a plurality of random information belonging to other random-based leader election rounds than the current locally complete round derives from said plurality of random information the global completeness of said locally complete random-based leader election round and calculates a designator of a single one of said running processes from the distributed random information of such said locally complete random-based leader election round,
a leader is elected among said running processes concurrently for each globally complete random-based leader election round based on said designator.

15. The method according to claim 14, wherein each process determinates a state of global completeness across all known running processes for each generator round, comprising:
each running process collecting information received from the other running processes for a plurality of concurrent election rounds and such information to be received in any arbitrary order, so as to obtain collections of random information, which take the form of collections of tuples, each collection consisting of tuples having the same generator round identifier, each running process considering a generator round to be in a state of global completeness if any number of tuples received for a plurality of subsequent generator rounds results in the receiving process determining the number of tuples received for some subsequent generator round exceeding a predefined minimum quorum for said subsequent generator round and said quorum to be greater than half of the number of running processes;

and step b) of claim 1 is initiated with regard to the completed generator round.

16. A method of randomly assigning a data processing task to one out of a plurality of processes running in a distributed network of data processing devices, the method comprising sending a task request to the plurality of running processes, electing a leader among said running processes by means of the method according to claim 1, and assigning the task to the leader.

17. A computer program product comprising instructions which, when the program is executed by data processing devices, such as computers, arranged in a distributed network cause the data processing devices to carry out the method of claim 1.

18. A data processing system comprising a plurality of data processing devices comprising means for carrying out the method of claim 1.

19. The method according to claim 4, wherein the second shared transformation function is defined as $m = R \pmod{k} + 1$, wherein m is the designator of the elected leader,
R is the distributed random information,
k is the total number of running processes, and
mod is the modulo operation, wherein the elected leader is elected by selecting the running process that corresponds to the $m^{th}$ element in said sorted set of running processes.

20. The method according to claim 6, wherein the first shared transformation function is $R = \Pi_{i=1}^{n} r_i \pmod{o}$, wherein R is the distributed random information,
r is the random information,
mod is the modulo operation, and
is a Mersenne prime defined as $o = 2^n - 1$, with n being $\geq 31$.

* * * * *